June 13, 1961   A. F. ERKE   2,988,391
INJECTION MOLDED SEAL DEVICE
Filed Aug. 8, 1960
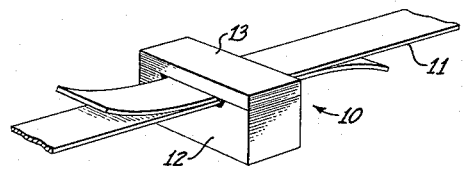
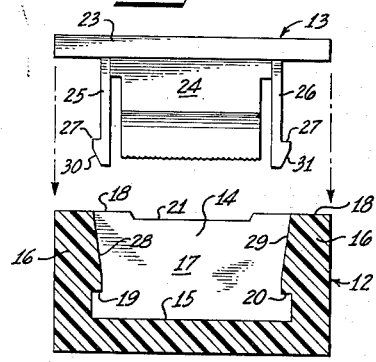
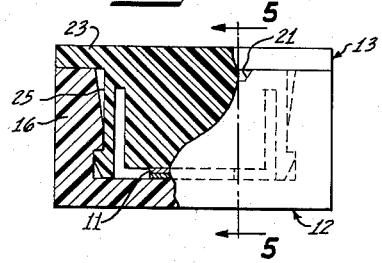
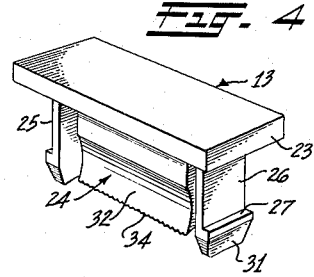
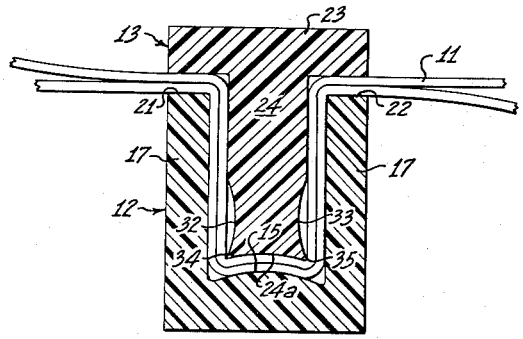
INVENTOR:
AUGUST F. ERKE
BY
*Mellin and Hanscom*
ATTORNEYS United States Patent Office 2,988,391
Patented June 13, 1961

2,988,391
INJECTION MOLDED SEAL DEVICE
August F. Erke, Mill Valley, Calif., assignor to J. F. Rhodes Co., San Francisco, Calif., a partnership
Filed Aug. 8, 1960, Ser. No. 48,150
7 Claims. (Cl. 292—325)

This invention relates generally to seal devices that when closed cannot be opened except by mutilation thereof. The invention more particularly involves a seal device that may be economically manufactured by injection molding processes and provides novel structural means for being attached to a sealing ribbon.

It is to be recognized that many kinds of seal devices are now conventionally used. The greater number of these seal devices are formed from metal and are provided with weakening lines of connection which ordinarily rupture upon tampering. Unless such weakening lines are provided, however, it is more than possible that these seals can be opened and resealed without detection. Inasmuch as it is considered impractical to specifically provide lines of weakness for seal devices made of many polychemical substances, the ordinary types of constructions used for metallic seals are generally unsatisfactory for plastic materials and the like, which may be formed by injection molding.

The present invention is basically comprised of two parts that may be joined together about a sealing ribbon. Once joined, the parts are held together by locking fingers and catch shoulders which cannot thereafter be released except by an obvious mutilation of the seal. This general description of the invention is also characteristic of many prior art seal devices and, thus, no emphasis is to be placed upon this structure alone. However, the present invention is more particularly characterized by the structural features which enable the seal device to be solidly clamped upon a sealing ribbon, confining said ribbon in a tortuous passageway.

It will be apparent in view of the following description that a primary object of this invention is to provide a novel seal device that is particularly suitable for being manufactured from plastic materials by injection molding processes.

Another object is to provide a seal device which is adapted for enclosing and engaging a sealing ribbon within a tortuous passageway, said passageway preventing a withdrawal and reinsertion of said ribbon by means other than an obvious destruction of the seal device.

An additional and more specific object of this invention is to provide a plastic or polychemical seal device adapted to be formed by injection molding, comprising: a solid receptacle having an internal cavity defined by a bottom surface and polyhedral side walls perpendicular thereto, at least two of said side walls being recessed adjacent said bottom surface and defining shoulder catches; and a complementary mating plug assembly including a polygonal lid, a centrally mounted solid plug projecting from one surface of said lid, and at least two resilient finger members projecting from said one surface and positioned thereon relative to said shoulder catches, each of said resilient finger members having an outwardly projecting lip adapted for engaging one of said shoulder catches upon insertion of said plug and finger members into said cavity; whereby ribbon material may be clamped in a tortuous passageway extending through a lateral opening between said lid and upper end surface of one side wall, between said one side wall and said plug, between said plug and said bottom surface, between a second said side wall and said plug and through a lateral opening between said lid and upper end surface of the second side wall.

Other objects of the invention will become apparent in the course of the following detailed description.

In the drawings, forming a part of this application, and in which like numerals are used to designate like parts throughout the same;

FIG. 1 is a perspective view of one embodiment of seal device contemplated by this invention, shown as being connected to the overlapped ends of a sealing band or ribbon;

FIG. 2 is an exploded side view of the seal device of FIG. 1 without the ribbon, the solid receptacle portion being shown in section;

FIG. 3 is a side view of the seal device assembled, a portion being shown in center section;

FIG. 4 is a perspective view of the plug assembly portion of the seal device shown in FIGS. 1–3; and FIG. 5 is an enlarged section taken on lines 5—5 of FIG. 3.

Referring more particularly to FIG. 1, there is shown one form of novel seal device 10 attached to a ribbon 11 of conventional sealing material. It will be understood that the ribbon material may be of various kinds including paper (reinforced or otherwise), cloth, metallic bands or plastic. And, in most instances it will be immaterial whether the ribbon is formed in a band having substantial width or whether the ribbon is more like a string or twisted wire. However, where a band-like material is used, a serrated gripping edge may be advantageously utilized for engaging the entire band width. Such a seal structure is more specifically explained hereinafter.

As shown in the exploded view of FIG. 2, the seal device 10 is comprised basically of two parts, a solid receptacle 12 and a complementary mating plug assembly 13. Receptacle 12 is formed with an internal rectangular cavity 14 that is defined by a bottom surface 15 and two pairs of opposite side walls 16 and 17 having upper end surfaces 18. The opposite side walls 16 are recessed adjacent bottom surface 15 and define spaced shoulder catches 19 and 20. In addition, the upper end surfaces of side walls 17 are centrally recessed or slotted and provide lateral openings 21 and 22 from the cavity 14.

Plug assembly 13 includes a rectangular lid 23, a centrally located solid plug 24 projecting from one surface of said lid, and two resilient finger members 25 and 26, also projecting from said one surface and positioned thereon relative to shoulders 19 and 20. Each finger member has an outwardly projecting lip 27 adapted for engaging its related shoulder catch upon insertion of plug 24 and finger members 25 and 26 into cavity 14.

In order to enhance the mating together of receptacle and plug assembly, several reliefs may be provided. Side walls 16 may be tapered inwardly from their upper end surface 18, thereby providing camming surfaces 28 and 29 for finger members 25 and 26, respectively. Similarly, the lateral faces 30 and 31 of the finger members may be slanted to aid in placing the plug and finger members into cavity 14.

The projecting length of plug 24 is substantially equal to but less than the depth of cavity 14. Thus, the lower surface 24a of the plug is placed into adjacency with the bottom surface 15 when the receptacle and plug assembly are mated. In this manner the surfaces 24a and 15 will clamp together upon a sealing ribbon which is inserted therebetween before the parts are matingly joined. But with most ribbon materials it will not be necessary to maintain precise dimension tolerances in producing the plug assembly and receptacle, for sufficient gripping strength is ordinarily derived from the multiple bends of the tortuous passageway between these parts.

To increase the sharpness of the bends adjacent the bottom surface 15, the plug 24 may be relieved along sides 32 and 33, as best shown in FIG. 5. In addition, the plug surface 24a may be recessed or formed as a concave surface to provide knife-like edges 34 and 35 proximate the adjacent side walls of cavity 14; and in the preferred form of construction illustrated by FIG. 5 the bottom surface 15 of cavity 14 may be curved convexly to complement the surface 24a. This construction will provide additional angularity to the confinement of the ribbon seal and insure adequate gripping action.

Where the ribbon seal is of a band material, like that shown for purposes of illustration, it may be desirable to form knife edges 34 and 35 with serrations as shown in FIG. 2. Then a pull upon either end of the ribbon will cause the serrations to pierce the band material, making positive engagement therewith. Obviously, such a means may also be used to weaken the ribbon to produce a rupture upon excessive pulling.

It will be apparent that the united receptacle and plug assembly defines a tortuous passageway securely confining the ribbon seal 11. This passageway extends laterally inward beneath lid 23 and through lateral opening 21. The ribbon is then caused to be directed downwardly between a side wall 17 and the plug 24; drawn across a knife edge 34; curved about the convex surface 15; passed around knife edge 35; extended upwardly toward opening 22; and passed laterally outward from the seal device. Each bend in the ribbon will produce frictional engagement with the seal device thereby preventing slippage and accidental removal. But even more importantly, should the seal device be constructed to provide minimum frictional engagements, the inherent angularity of the passageway would prevent the reinsertion of the ribbon if it was removed. It is believed that a seal device such as has been described is completely tamperproof, for its inventive design precludes an opening of the seal except by its obvious destruction or mutilation.

While a preferred embodiment of seal device has been illustrated and described, it will be apparent that various modifications and changes may be made without departing from the spirit of the invention or the scope of the appended claims, and each of such modifications and changes is contemplated.

Having thus described my invention, what I claim and desire to secure by Letters Patent is:

1. A plastic or polychemical seal device adapted to be formed by injection molding, comprising: a solid receptacle having an internal cavity defined by a bottom surface and polyhedral side walls perpendicular thereto, at least two of said side walls being recessed adjacent said bottom surface and defining shoulder catches; and a complementary mating plug assembly including a polygonal lid, a centrally located solid plug projecting from one surface of said lid approximately equal to but less than the depth of said cavity, and at least two resilient finger members projecting from said one surface and positioned thereon relative to said shoulder catches, each of said resilient finger members having an outwardly projecting lip adapted for engaging one of said shoulder catches upon insertion of said plug and finger members into said cavity; whereby ribbon material may be clamped in a tortuous passageway extending through a lateral opening between said lid and upper end surface of one side wall, between said one side wall and said plug, between said plug and said bottom surface, between a second said side wall and said plug, and through a lateral opening between said lid and upper end surface of the second side wall.

2. The seal device of claim 1 wherein said solid plug has a recessed lower surface projected to a position adjacent said bottom surface and providing angular projections for engaging ribbon material between said plug and the bottom cavity surface of said receptacle.

3. The seal device of claim 2 wherein said angular projections are defined by a concave surface, providing knife edges proximate adjacent side walls, and said bottom surface being convexly formed complementary thereto to provide a more angular passageway between said receptacle and said plug assembly.

4. The seal device of claim 3 having knife edges that are serrated for engaging a band type of ribbon material across its width dimension.

5. A plastic or polychemical seal device adapted to be formed by injection molding, comprising: a solid receptacle having an internal rectangular cavity defined by a bottom surface and two pairs of opposite side walls having upper end surfaces, one pair of said opposite side walls being recessed adjacent said bottom surface and defining oppositely spaced shoulder catches; and a complementary mating plug assembly including a rectangular lid, a centrally located solid plug projecting from one surface of said lid approximately equal to but less than the depth of said cavity, and two resilient finger members projecting from said one surface on opposite sides of said plug, each of said resilient finger members having an outwardly projecting lip adapted for engaging one of said shoulder catches upon insertion of said plug and finger members into said cavity; whereby ribbon material, such as employed with seal devices, may be clamped in a tortuous passageway extending through a lateral opening between said lid and upper end surface of one of said second pairs of side walls, between said one side wall and said plug, between said plug and said bottom surface, between the other of said second pair of side walls and said plug and through a lateral opening between said lid and upper end surface of the other side wall.

6. The seal device of claim 5 wherein said solid plug has a recessed lower surface projected to a position adjacent said bottom surface and providing angular projections for engaging ribbon material between said plug and the bottom cavity surface of said receptacle.

7. The seal device of claim 6 wherein said angular projections are defined by a concave surface, providing knife edges proximate adjacent side walls, and said bottom surface being convexly formed complementary thereto to provide a more angular passageway between said receptacle and said plug assembly.

References Cited in the file of this patent

FOREIGN PATENTS 28,022   Great Britain _____ Dec. 19, 1907